United States Patent
Yang (10) Patent No.: US 10,575,129 B1
(45) Date of Patent: Feb. 25, 2020

(54) COMMODITY GUIDING METHOD, COMMODITY GUIDING APPARATUS, AND STORAGE MEDIUM

(71) Applicant: BOE Technology Group Co., Ltd., Beijing (CN)

(72) Inventor: Qingguo Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/380,427

(22) Filed: Apr. 10, 2019

(30) Foreign Application Priority Data

Sep. 21, 2018 (CN) .......................... 2018 1 1109678

(51) Int. Cl.
*H04W 4/024* (2018.01)
*G06Q 30/06* (2012.01)
*H04W 88/02* (2009.01)

(52) U.S. Cl.
CPC ........ *H04W 4/024* (2018.02); *G06Q 30/0639* (2013.01); *H04W 88/02* (2013.01)

(58) Field of Classification Search
CPC . H04W 4/024; G06Q 30/0639; G01C 21/206; G06F 16/29
USPC ................. 455/456.1, 456.3, 404.2
See application file for complete search history.

(56) References Cited

U.S. PATENT DOCUMENTS

| | | | |
|---|---|---|---|
| 2002/0049529 A1* | 4/2002 | Ikeda | G01C 21/26 701/461 |
| 2002/0087266 A1* | 7/2002 | Sugimoto | G01C 21/20 701/468 |
| 2014/0282257 A1* | 9/2014 | Nixon | G05B 11/01 715/835 |
| 2015/0052048 A1* | 2/2015 | Kagawa | G06F 21/31 705/40 |
| 2015/0201234 A1* | 7/2015 | Hayakawa | G06F 1/1626 725/35 |
| 2018/0068369 A1* | 3/2018 | Sasaki | G06Q 30/0641 |
| 2018/0101892 A1* | 4/2018 | Pandey | G01C 21/206 |

* cited by examiner

*Primary Examiner* — CongVan Tran
(74) *Attorney, Agent, or Firm* — McDermott Will & Emery LLP (57) ABSTRACT

Embodiments of the present disclosure provide a commodity guiding method, a commodity guiding apparatus, and a storage medium, wherein the method performed at a mobile terminal includes: receiving information related to one or more commodities via a wireless communicator of the mobile terminal; determining at least one of the one or more commodities as a target commodity based on the information; and transmitting a guiding request corresponding to the target commodity via the wireless communicator, wherein the guiding request is used to request guidance directed to the target commodity.

14 Claims, 4 Drawing Sheets

COMMODITY GUIDING METHOD, COMMODITY GUIDING APPARATUS, AND STORAGE MEDIUM

CROSS-REFERENCE TO RELATED APPLICATION(S)

This application claims priority to the Chinese Patent Application No. CN 201811109678.8, filed on Sep. 21, 2018, entitled "COMMODITY GUIDING METHOD, COMMODITY GUIDING APPARATUS, AND STORAGE MEDIUM", which is incorporated herein by reference in its entirety.

TECHNICAL FIELD

The present disclosure relates to the field of supermarket navigation, and more particularly, to a commodity guiding method, a commodity guiding apparatus, and a storage medium.

BACKGROUND

With the expansion and deepening of economic development, consumption levels and users' purchasing power are improved, which brings huge business opportunities to supermarkets. Currently, indoor environments such as large shopping supermarkets in China have been widely popularized in large and medium-sized cities, and shopping environments of the supermarkets have been continuously improved. However, while the supermarkets are continuously scaled up, it also brings a lot of inconvenience to users and management of the supermarkets. For example, due to a large area of a supermarket and a limited number of sales personnel, users not only cannot find commodities to be purchased, but also cannot know specific information of the commodities in time. In addition, in an indoor navigation system in the related art, a mobile phone is usually used to display a navigation path, which cannot be visually presented to a user, and the user is watching the mobile phone during navigation of the mobile phone, which is not conducive to guiding the user's attention to commodities.

In summary, in the related art, there are disadvantages that the indoor navigation to commodities is not intuitive, the guiding efficiency is low, or it is difficult to guide the user's attention to the commodities.

SUMMARY

According to an aspect of the present disclosure, there is provided a computer implemented method at a mobile terminal for commodity guiding, the method comprising: receiving information related to one or more commodities via a wireless communicator of the mobile terminal; determining at least one of the one or more commodities as a target commodity based on the information; and transmitting a guiding request corresponding to the target commodity via the wireless communicator, wherein the guiding request is used to request guidance directed to the target commodity.

In some embodiments, the step of determining at least one of the one or more commodities as a target commodity based on the information further comprises: displaying the information via a display of the mobile terminal; receiving an input to make a selection from the one or more commodities via an input apparatus of the mobile terminal; and determining at least one of the one or more commodities as the target commodity based on the input.

In some embodiments, the method further comprises: receiving a navigation path responsive to the guiding request via the wireless communicator; and displaying the navigation path via a display of the mobile terminal.

In some embodiments, the step of displaying the navigation path via a display of the mobile terminal comprises: displaying at least one of text symbol information or icon information via the display.

In some embodiments, the step of displaying the information via a display of the mobile terminal comprises: displaying at least one of names, prices, pictures, promotional information, or location information of the one or more commodities via the display.

According to another aspect of the present disclosure, there is provided a computer implemented method at a server for commodity guiding, the method comprising: transmitting information related to one or more commodities via a communicator of the server; receiving a guiding request corresponding to a target commodity via the communicator, the target commodity being at least one of the one or more commodities; determining one or more electronic signages in the vicinity of the target commodity according to the guiding request; and transmitting an instruction to the one or more electronic signages to instruct the one or more electronic signages to display an indication sign for guidance from the one or more electronic signages to the target commodity, respectively.

In some embodiments, the communicator of the server is a wireless communicator, and the step of transmitting information related to one or more commodities via a communicator of the server comprises: broadcasting the information to a designated space via the wireless communicator.

In some embodiments, the method further comprises: acquiring, according to the guiding request, current location information of the mobile terminal, which transmits the guiding request, from a positioning apparatus via the communicator; determining a navigation path according to the current location information of the mobile terminal and location information of the target commodity; and transmitting the navigation path to at least one of the mobile terminal or the electronic signages via the communicator.

In some embodiments, the step of transmitting the navigation path to the electronic signage via the communicator comprises: determining a relative distance between the mobile terminal and the electronic signage based on the current location information of the mobile terminal and location information of the electronic signage; comparing the relative distance with a preset first threshold distance; and transmitting the navigation path to the electronic signage via the communicator in response to the relative distance being less than the first threshold distance.

In some embodiments, the step of transmitting the navigation path to the electronic signage via the communicator further comprises: comparing the relative distance with a preset second threshold distance; and transmitting a blinking instruction to the electronic signage via the communicator to instruct the electronic signage to cause the navigation path displayed thereon to blink in response to the relative distance being less than the second threshold distance, wherein the second threshold distance is less than the first threshold distance.

In some embodiments, the instruction transmitted to the one or more electronic signages further indicates the electronic signage to continuously display the indication sign only within a preset time.

According to another aspect of the present disclosure, there is provided a mobile terminal, comprising: a wireless communicator; a processor communicatively coupled to the wireless communicator; and a memory having stored thereon instructions which, when executed by the processor, cause the processor to perform the method at the mobile terminal as described above.

According to another aspect of the present disclosure, there is provided a server, comprising: a communicator; a processor communicatively coupled to the communicator; and a memory having stored thereon instructions which, when executed by the processor, cause the processor to perform the method at the server as described above.

According to another aspect of the present disclosure, there is provided a computer readable storage medium, having stored thereon computer instructions which, when executed by a processor, implement the steps of various methods described above.

According to another aspect of the present disclosure, there is provided a system for commodity guiding, the system comprising: one or more positioning apparatuses, one or more electronic signages, one or more mobile terminals, and a server communicatively connected to the one or more positioning apparatuses, the one or more electronic signages, and the one or more mobile terminals. Each of the one or more mobile terminals comprises: a wireless communicator; a processor communicatively coupled to the wireless communicator; a memory having stored thereon instructions which, when executed by the processor, cause the processor to: receive information related to one or more commodities via the wireless communicator; determine at least one of the one or more commodities as a target commodity based on the information; and transmit a guiding request corresponding to the target commodity via the wireless communicator, wherein the guiding request is used to request guidance directed to the target commodity. Further, the server comprises: a communicator; a processor communicatively coupled to the communicator; and a memory having stored thereon instructions which, when executed by the processor, cause the processor to: transmit information related to one or more commodities via the communicator; receive a guiding request corresponding to a target commodity via the communicator, the target commodity being at least one of the one or more commodities; determine one or more electronic signages in the vicinity of the target commodity according to the guiding request; and transmit an instruction to the one or more electronic signages to instruct the one or more electronic signages to display an indication sign for guidance from the one or more electronic signages to the target commodity, respectively.

BRIEF DESCRIPTION OF THE ACCOMPANYING DRAWINGS

The above and/or additional aspects and advantages of the present disclosure will become apparent and readily understandable from the following description of the embodiments in conjunction with accompanying drawings, in which.

DETAILED DESCRIPTION

The embodiments of the present disclosure will be described in detail below, and examples of the embodiments are illustrated in the accompanying drawings, throughout which the same or similar reference signs are used to refer to the same or similar elements or elements having the same or similar functions. The embodiments described below with reference to the accompanying drawings are intended to be illustrative only, and are merely used to explain the present disclosure, but should not be construed as limiting the present disclosure.

It can be understood by those skilled in the art that singular forms "a", "an", "the" used here may also comprise plural forms, unless otherwise stated. It should also be understood that phrase "comprise" used in the specification of the present disclosure refers to presence of the features, integers, steps, operations, elements and/or components, but should not preclude the presence or addition of one or more other features, integers, steps, operations, elements, components, and/or groups thereof. It should be understood that when an element is referred to as being "connected" to another element, it may be directly connected to the other element, or there may be an intermediate element therebetween. Further, "connected" as used here may comprise a wireless connection. The phrase "and/or" used here comprises all or any of one or more of associated listed items, or all combinations thereof.

It can be understood by those skilled in the art that all terms (comprising technical and scientific terms) used here have the same meaning as commonly understood by those of ordinary skill in the art to which the present disclosure belongs, unless otherwise defined. It should also be understood that terms such as those defined in a general dictionary should be understood to have meaning consistent with the meaning in the context of the related art, and will not be explained as an idealized or excessively formal meaning unless specifically defined as here.

Figure 1:
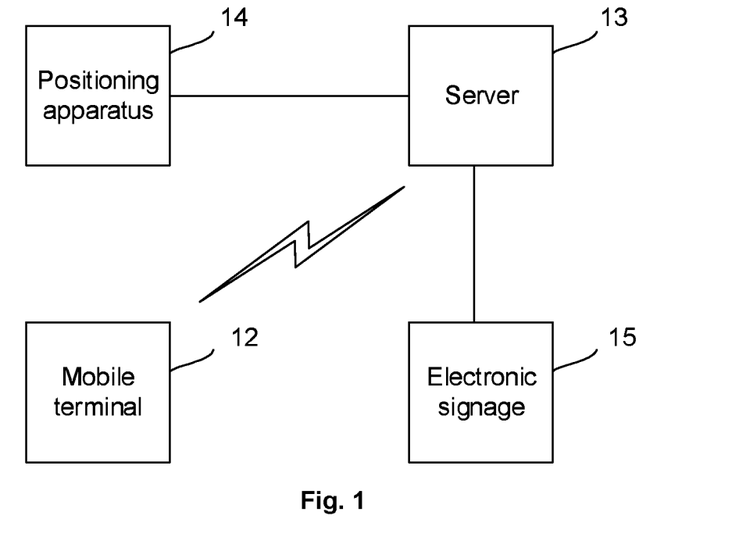
FIG. 1 is a schematic structural diagram of a commodity guiding system according to an embodiment of the present disclosure.

FIG. 1 is a schematic structural diagram of a commodity guiding system according to an embodiment of the present disclosure. In the embodiment of the present disclosure, a mobile terminal 12, a positioning apparatus 14, and an electronic signage 15 may be respectively disposed in the same designated space, such as a supermarket. A server 13 is disposed in another designated space, such as a machine room. As shown in FIG. 1, the server 13 is in wireless communication with the mobile terminal 12, the positioning apparatus 14, and the electronic signage 15 respectively, and the mobile terminal 12 is in wireless communication with the positioning apparatus 14.

Figure 2:
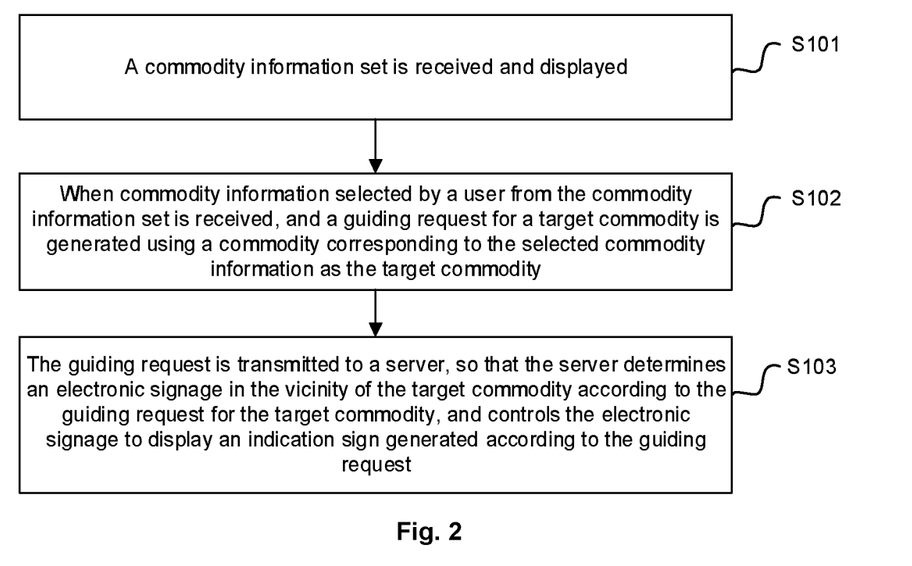
FIG. 2 is a flowchart of a commodity guiding method according to an embodiment of the present disclosure.

FIG. 2 illustrates a flowchart of a first embodiment of a commodity guiding method according to an embodiment of the present disclosure. As shown in FIG. 2, the commodity guiding method comprises the following steps.

In S101, a commodity information set is received and displayed.

In S102, when commodity information selected by a user from the commodity information set is received, and a guiding request for a target commodity is generated using a commodity corresponding to the selected commodity information as the target commodity.

In S103, the guiding request is transmitted to a server, so that the server determines an electronic signage in the vicinity of the target commodity according to the guiding request for the target commodity, and controls the electronic signage to display an indication sign generated according to the guiding request.

With the commodity guiding method according to the embodiment of the present disclosure, a guiding request may be generated according to the commodity information, and the server 13 may display an indication sign on the electronic signage 15 based on the guiding request, which causes the user to shift his/her attention from the mobile terminal 12 to the electronic signage 15 in the vicinity of the target commodity. Thereby, it facilitates guiding the user to pay attention to the desired commodity in the vicinity of the electronic signage 15, so that the user can conveniently find the desired commodity, thereby improving the commodity guiding efficiency.

In order to be able to guide the user to find the corresponding target commodity while displaying the commodity information, the commodity guiding method may thus further comprise: receiving and displaying a navigation path.

Figure 3:
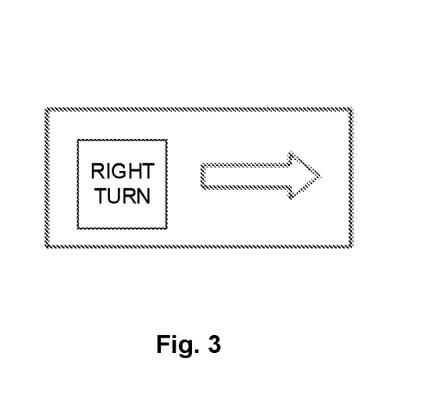
FIG. 3 is a schematic diagram of an indication sign according to an embodiment of the present disclosure.

In addition, displaying a navigation path may comprise: displaying text symbol information, wherein the text symbol information comprises text symbols such as "left turn", "right turn", "forward" or "backward". In another embodiment, displaying a navigation path may further comprise: displaying icon information. Of course, displaying a navigation path may further comprise: displaying a combination of the text symbol information and the icon information, for example, as shown in FIG. 3, displaying a text symbol of "right turn" and an arrow icon indicating a direction. Since the user is guided to find the commodity using the text symbol information and the icon information, the guiding efficiency is further improved.

Optionally, displaying a commodity information set may comprise: displaying at least one of names, prices, pictures, promotion information, and location information of a plurality of commodities, so that the commodity information set may present information related to a plurality of commodities, to facilitate the user selecting a target commodity, thereby improving the user experience.

Figure 4:
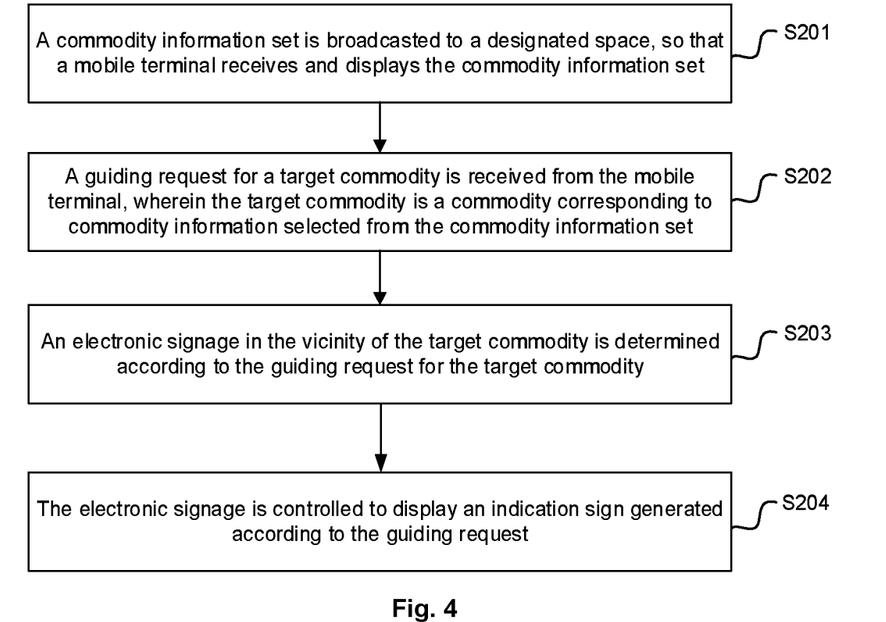
FIG. 4 is a flowchart of a commodity guiding method according to another embodiment of the present disclosure.

FIG. 4 illustrates a flowchart of another embodiment of a commodity guiding method according to an embodiment of the present disclosure. As shown in FIG. 4, the embodiments of the present disclosure further disclose a commodity guiding method, which comprises the following steps.

In S201, a commodity information set is broadcasted to a designated space, so that a mobile terminal receives and displays the commodity information set.

In the embodiment of the present disclosure, the designated space may be an indoor space.

In S202, a guiding request for a target commodity is received from the mobile terminal, wherein the target commodity is a commodity corresponding to commodity information selected from the commodity information set.

In S203, an electronic signage 15 in the vicinity of the target commodity is determined according to the guiding request for the target commodity.

In S204, the electronic signage is controlled to display an indication sign generated according to the guiding request.

Compared with the commodity guiding method in the embodiment described above, with the commodity guiding method according to the present embodiment, an indication sign may be displayed on the electronic signage 15 based on the received guiding request for the target commodity, which causes the user to shift his/her attention from the mobile terminal 12 to the electronic signage 15 in the vicinity of the target commodity. Thereby, it facilitates guiding the user to pay attention to the desired commodity in the vicinity of the electronic signage 15, so that the user can conveniently find the desired commodity, thereby improving the commodity guiding efficiency.

Optionally, in order to be able to facilitate guiding the user to find the target commodity using a navigation path, so as to further improve the guiding efficiency, the commodity guiding method according to the embodiment of the present disclosure further comprises: acquiring real-time location information of the mobile terminal 12 through the positioning apparatus 14 according to the guiding request for the target commodity. The navigation path is determined according to the real-time location information and location information of the electronic signage 15, and the navigation path is returned to the mobile terminal 12 or the electronic signage 15, so that the mobile terminal 12 or the electronic signage 15 displays the navigation path.

Optionally, returning the navigation path to the electronic signage, so that the electronic signage displays the navigation path comprises: comparing a real-time distance between the mobile terminal 12 and the electronic signage 15 in the navigation path with a preset first threshold distance, and displaying the navigation path on the electronic signage 15 when the real-time distance is less than the first threshold distance.

For example, the positioning apparatus 14 may position the mobile terminal 12 in real time, and corresponding navigation information may be displayed on an electronic signage 15 in the vicinity of the mobile terminal 12. When a distance between the mobile terminal 12 and the electronic signage 15 is greater than a certain distance, the relevant navigation information is not displayed on the electronic signage 15. When the distance between the mobile terminal 12 and the electronic signage 15 is less than the certain distance, navigation information, instead of original information, is displayed on the electronic signage 15. When the distance between the mobile terminal 12 and the electronic signage 15 is greater than the certain distance once again, the original information, instead of the navigation information, is displayed on the electronic signage 15.

Therefore, when the user approaches the target commodity, an indication sign may be displayed on the electronic signage 15 to guide the user to the target commodity, which facilitates the user finding the desired commodity, thereby improving the commodity guiding efficiency.

In addition, a blinking indication sign may prompt the user that he/she is very close to the target commodity, thereby improving the guiding efficiency and the user experience. Therefore, the commodity guiding method may further comprise: comparing the real-time distance with a preset second threshold distance, and transmitting a blinking instruction to the electronic signage 15 to cause the indication sign displayed on the electronic signage 15 to blink when the real-time distance is less than the second threshold distance, wherein the second threshold distance is less than the first threshold distance. For example, the electronic signage 15 may also blink at a different frequency when the navigation information is displayed on the electronic signage 15.

Of course, when the navigation continues over a certain period of time, the electronic signage 15 may further display encouraging information, for example, "come on!", "almost approach the commodity!" etc. When the user almost approaches the desired commodity, the electronic signage 15 prompts the user to find the commodity in a special color, in a blinking manner etc. The encouraging words may be related to a commodity. For example, when the user goes through a beverage area, "if you drink red bull, you may find the commodity more rapidly" may be displayed as the encouraging words.

In order to prevent the indication sign from being displayed for a long time and thus affecting other users, controlling the electronic signage 15 to display an indication sign in the embodiment of the present disclosure comprises: displaying the indication sign on the electronic signage 15 within a preset time.

Further, acquiring real-time location information of the mobile terminal 12 through the positioning apparatus 14 may comprise a step of acquiring the real-time location information of the mobile terminal 12 through communicative interaction between the positioning apparatus 14 and a corresponding positioning component in the mobile terminal 12, or acquiring the real-time location information of the mobile terminal 12 through image recognition of the mobile terminal 12 by the positioning apparatus 14. The real-time location information may be acquired through communicative interaction or image recognition, and an appropriate information acquisition manner may be selected according to practical conditions, which makes the implementation more diversified, and can reduce the usage cost.

Specific steps of the embodiments of the present disclosure will be described in detail below through an application scenario.

When a user is shopping in a supermarket, the user may select desired commodity information on the mobile terminal 12, wherein the commodity information comprises names, prices, pictures, and promotion information etc. of commodities. The mobile terminal 12 may further display location information of the commodities, for example, shelves where the commodities are located in the supermarket, and specific locations of the respective commodities on the shelves. The mobile terminal 12 may be a device having a mobile and communication function, for example, a shopping cart or a mobile phone etc.

When the user has selected the commodity, the user clicks, for example, a "navigation" button on the mobile terminal 12 to issue a guiding request. At this time, the positioning apparatus 14 positions the mobile terminal and transmits positioning information to the server 13. Specifically, the positioning apparatus 14 may be a Radio Frequency Identification (RFID) positioning apparatus 14, a Bluetooth positioning apparatus 14 or an image positioning apparatus 14 (for example, a camera) etc. in the supermarket. In an example, there may be a plurality of Bluetooth positioning apparatuses 14 disposed at different locations in the supermarket, and the mobile terminal 12 is positioned in real time according to a corresponding Bluetooth component on the mobile terminal 12 using the Bluetooth positioning apparatuses 14 disposed in the supermarket. Optionally, there may also be a plurality of image positioning apparatuses 14 disposed in the supermarket to perform image recognition on the mobile terminal 12, so as to position the mobile terminal 12. The positioning apparatus 14 then transmits positioning information to the server 13.

Further, the server 13 may generate a navigation path from the mobile terminal to the commodity selected by the user according to the positioning information.

The user may search for the target commodity according to the navigation path, the positioning apparatus 14 positions the mobile terminal 12 in real time, and navigation information is displayed on an electronic signage 15 in the vicinity of the mobile terminal 12. When the mobile terminal 12 is away from the electronic signage 15 by a certain distance, no navigation information is displayed on the electronic signage 15; and when the mobile terminal 12 is close to the electronic signage 15 by a certain distance, the navigation information is displayed on the electronic signage 15, and thereby the user may pay attention to the electronic signage 15 to search for the commodity, until the user finds the commodity.

Figure 5:
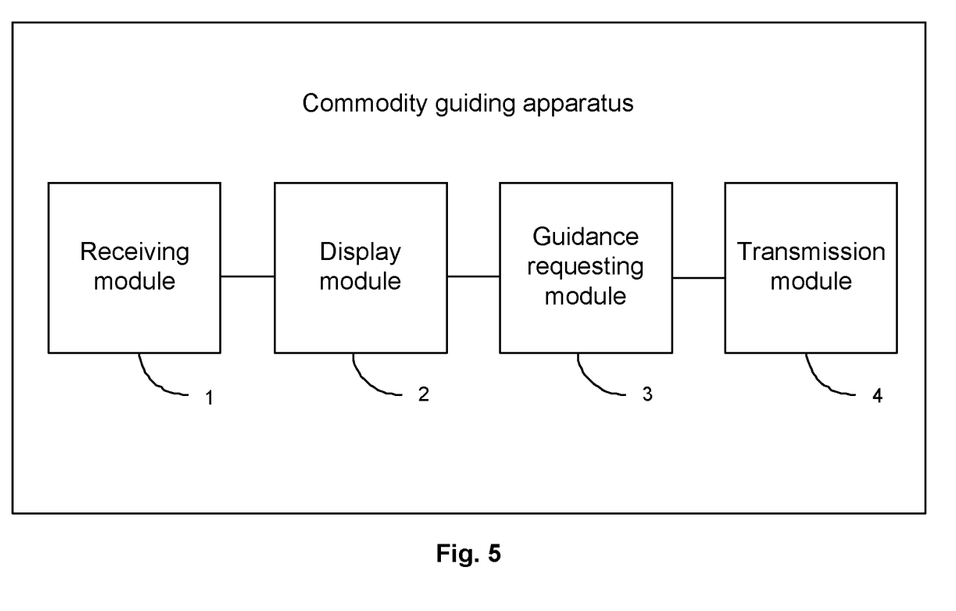
FIG. 5 is a schematic structural diagram of a commodity guiding apparatus according to an embodiment of the present disclosure.

Further, FIG. 5 illustrates a schematic structural diagram of a commodity guiding apparatus according to an embodiment of the present disclosure. In FIG. 5, there is disclosed a commodity guiding apparatus, which is disposed in the mobile terminal 12. The apparatus comprises a receiving module 1, a display module 2, a guidance requesting module 3 and a transmission module 4.

The receiving module 1 is configured to receive a commodity information set.

The display module 2 is configured to display the commodity information set.

The guidance requesting module 3 is configured to, when commodity information selected by a user from the commodity information set is received, generate a guiding request for a target commodity using a commodity corresponding to the selected commodity information as the target commodity.

The transmission module 4 is configured to transmit the guiding request to the server 130, so that the server 130 determines an electronic signage 150 in the vicinity of the target commodity according to the guiding request for the target commodity, and controls the electronic signage 15 to display an indication sign generated according to the guiding request.

An indication sign is displayed on the electronic signage 15 based on the guiding request, which causes a consumer to shift his/her attention from the mobile terminal 12 to the electronic signage 15 in the vicinity of the target commodity. Thereby, it facilitates guiding the consumer to pay attention to the desired commodity in the vicinity of the electronic signage 15, so that the consumer can conveniently find the desired commodity, thereby improving the commodity guiding efficiency.

Figure 6:
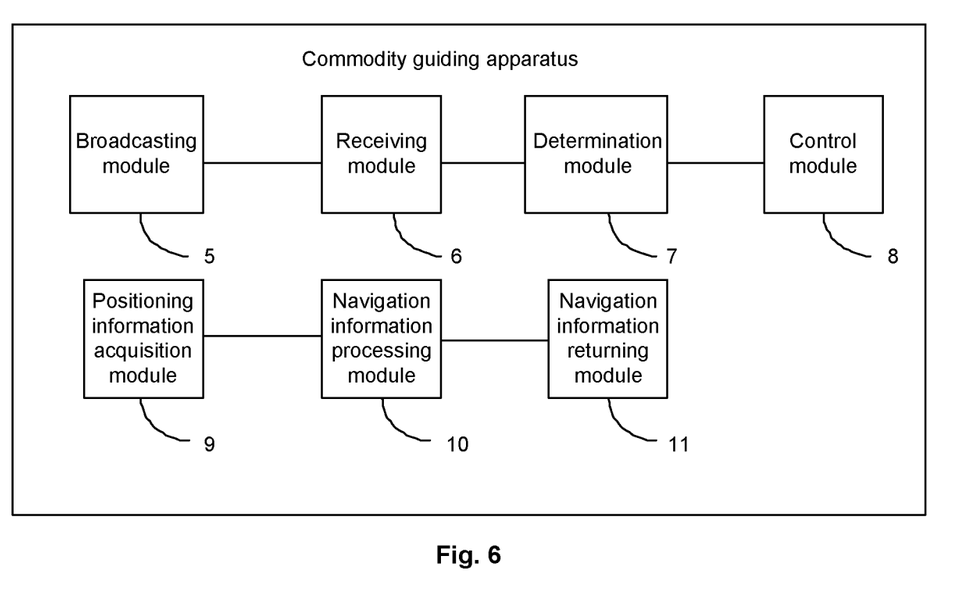
FIG. 6 is a schematic structural diagram of a commodity guiding apparatus according to another embodiment of the present disclosure.

FIG. 6 illustrates a schematic structural diagram of a commodity guiding apparatus according to another embodiment of the present disclosure. In FIG. 6, there is disclosed a commodity guiding apparatus, which is disposed in the server 13. The apparatus comprises: a broadcasting module 5, a receiving module 6, a determination module 7 and a control module 8.

The broadcasting module 5 is configured to broadcast a commodity information set to a designated space, so that a mobile terminal receives and displays the commodity information set.

The receiving module 6 is configured to receive a guiding request for a target commodity from the mobile terminal, wherein the target commodity is a commodity corresponding to commodity information selected from the commodity information set.

The determination module 7 is configured to determine an electronic signage in the vicinity of the target commodity according to the guiding request for the target commodity.

The control module 8 is configured to control the electronic signage 15 to display an indication sign generated according to the guiding request.

The commodity guiding apparatus receives a guiding request, and displays an indication sign on the electronic signage 15 based on the guiding request, which causes a consumer to shift his/her attention from the mobile terminal 12 to the electronic signage 15 in the vicinity of the target commodity. Thereby, it facilitates guiding the consumer to pay attention to the desired commodity in the vicinity of the electronic signage 15, so that the consumer conveniently find the desired commodity, thereby improving the commodity guiding efficiency.

Still with reference to FIG. 6, in order to enable the commodity guiding apparatus according to the embodiment of the present disclosure to have a navigation function to enhance the competitiveness of commodities, the commodity guiding apparatus may further comprise: a positioning information acquisition module 9, a navigation information processing module 10, and a navigation information returning module 11.

The positioning information acquisition module 9 is configured to acquire real-time location information of the mobile terminal 12 through the positioning apparatus 14 according to a guiding request for the target commodity.

The navigation information processing module 10 is configured to determine a navigation path according to the real-time location information and location information of the electronic signage 15.

Further, the navigation information returning module 11 is configured to return the navigation path to the mobile terminal 12 or the electronic signage 15, so that the mobile terminal 12 or the electronic signage 15 displays the navigation path.

Further, the embodiments of the present disclosure disclose a computer readable storage medium, having stored thereon computer instructions which, when executed by a processor, implement the steps of the commodity guiding method performed at the mobile terminal 12 as described above. The processing steps of the storage medium may be the same as those of the commodity guiding method described above, the advantages of the storage medium are also the same as those of the commodity guiding method described above, and thus description thereof will not be repeated.

Further, the embodiments of the present disclosure disclose a computer readable storage medium, having stored thereon computer instructions which, when executed by a processor, implement the steps of the commodity guiding method performed at the server 13 as described above. The processing steps of the storage medium may be the same as those of the commodity guiding method described above, the advantages of the storage medium are also the same as those of the commodity guiding method described above, and thus description thereof will not be repeated.

Figure 7:
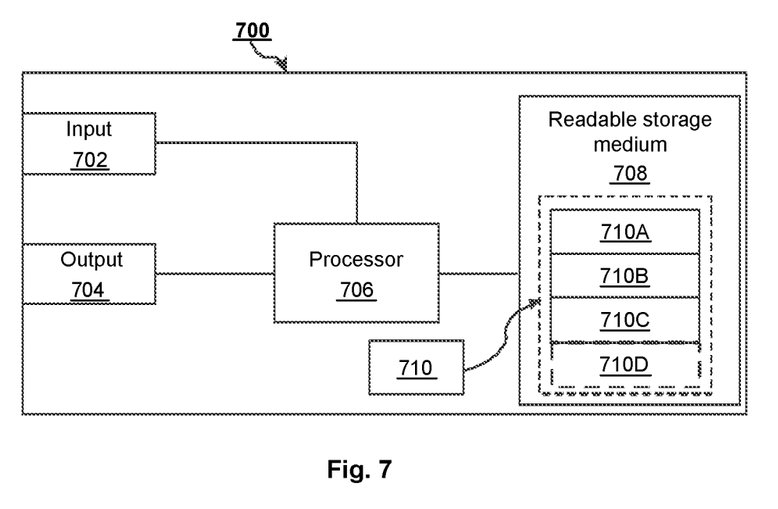
FIG. 7 is a schematic diagram of a hardware arrangement of a mobile terminal and/or a server according to an embodiment of the present disclosure.

FIG. 7 is a diagram of a hardware arrangement 700 of a mobile terminal and/or a server according to an embodiment of the present disclosure. The hardware arrangement 700 comprises a processor 706 (for example, a Digital Signal Processor (DSP), a Central Processing Unit (CPU), etc.) The processor 706 may be a single processing unit or a plurality of processing units for performing different actions of the flow described herein. The arrangement 700 may further comprise an input unit 702 for receiving signals from other entities, and an output unit 704 for providing signals to other entities. The input unit 702 and the output unit 704 may be arranged as a single entity or separate entities.

Further, in some embodiments, the input unit 702 and the output unit 704 may further comprise a communicator to enable external communication with the processor 706, such as a wireless communication unit, a wired communication unit, etc. The wireless communication unit may be a communication unit which supports protocols such as Wi-Fi, Bluetooth, 3GPP series (comprising, for example, GSM, GPRS, CDMA, WCDMA, CDMA2000, TD-SCDMA, LTE, LTE-A, 5G NR, etc.), Wi-Max, etc. The wired communication unit may be a communication module which supports protocols such as Ethernet, USB, fiber optics, xDSL, etc. In some embodiments, the input unit 702 and/or the output unit 704 may also be an interface which is communicatively connected to an external communicator. In other words, in these embodiments, the mobile terminal and/or the server itself may not comprise a communicator, but may communicate with an external communicator through an interface to implement the same or similar functionality.

In addition, the arrangement 700 may comprise at least one readable storage medium 708 in a form of non-volatile or volatile memory, such as an Electrically Erasable Programmable Read-Only Memory (EEPROM), a flash memory, and/or a hard disk driver. The readable storage medium 708 comprises a computer program 710 which comprises codes/computer readable instructions that, when executed by the processor 706 in the arrangement 700, cause the hardware arrangement 700 and/or a device including the hardware arrangement 700 to perform, for example, flows described above in connection with FIG. 2 or 4 and any variations thereof.

The computer program 710 may be configured with computer program codes, having for example architecture of computer program module 710A-710D. Therefore, in an exemplary embodiment when the hardware arrangement 700 is used in a mobile device, for example, the codes in the computer program of the arrangement 700 may comprise a module 710A configured to receive information related to one or more commodities via a wireless communicator of the mobile terminal; a module 710B configured to determine at least one of the one or more commodities as a target commodity based on the information; and a module 710C configured to transmit a guiding request corresponding to the target commodity via the wireless communicator, wherein the guiding request is used to request guidance directed to the target commodity.

Further, in an exemplary embodiment when the hardware arrangement 700 is used in a server, for example, the codes in the computer program of the arrangement 700 may comprise a module 710A configured to transmit information related to one or more commodities via a communicator of the server; a module 710B configured to receive a guiding request corresponding to a target commodity via the communicator, wherein the target commodity is at least one of the one or more commodities; a module 710C configured to determine one or more electronic signages in the vicinity of the target commodity according to the guiding request; and a module 710D configured to transmit an instruction to the one or more electronic signages to instruct the one or more electronic signages to display an indication sign for guidance from the one or more electronic signages to the target commodity, respectively.

The computer program module may substantially perform various actions in the flows illustrated in FIG. 2 or 4 to simulate a voice communication apparatus. In other words, when different computer program modules are executed in the processor 706, they may correspond to different units or modules in a voice communication apparatus as a transmitting terminal, a voice communication apparatus as a receiving terminal, or both of the voice communication apparatuses.

While the code means in the embodiments disclosed above in connection with FIG. 7 are implemented as computer program modules which, when executed in the processor 706, cause the hardware arrangement 700 to perform the actions described above in connection with FIG. 2 or 4, in alternative embodiments, at least one of the code means may be implemented at least in part as a hardware circuit.

The processor may be a single Central Processing Unit (CPU), but may also comprise two or more processing units. For example, the processor may comprise a general purpose microprocessor, an instruction set processor, and/or a related chipset and/or a dedicated microprocessor (for example, an Application Specific Integrated Circuit (ASIC)). The processor may also comprise an on-board memory for caching purposes. The computer program may be carried by a computer program product connected to the processor. The computer program product may comprise a computer-readable medium having stored thereon a computer program. For example, the computer program product may be a flash memory, a Random Access Memory (RAM), a Read Only Memory (ROM), or an EEPROM, and the computer program modules may, in an alternative embodiment, be distributed to different computer program products in a form of memory within the device.

Advantageous effects obtained by applying the embodiments of the present disclosure may comprise (but are not limited to):

1. With the commodity guiding method, a guiding request may be generated according to the commodity information, and an indication sign may be displayed on the electronic signage based on the guiding request, which causes the user to shift his/her attention from the mobile terminal to the electronic signage in the vicinity of the target commodity. Thereby, it facilitates guiding the user to pay attention to the desired commodity in the vicinity of the electronic signage, so that the user can conveniently find the desired commodity, thereby improving the commodity guiding efficiency.

2. With the commodity guiding method, when the user approaches the target commodity, an indication sign may be displayed on the electronic signage to guide the user to the target commodity, which facilitates the user finding the desired commodity, thereby improving the commodity guiding efficiency.

The above description is only some of the embodiments of the present disclosure, and it should be illustrated that those of ordinary skill in the art can also make several improvements and modifications without departing from the principles of the present disclosure, and these improvements and modifications should also be construed as falling within the protection scope of the present disclosure.

I claim:

1. A computer implemented method at a mobile terminal for commodity guiding, the method comprising:
   receiving information related to one or more commodities via a wireless communicator of the mobile terminal;
   determining at least one of the one or more commodities as a target commodity based on the information;
   transmitting a guiding request corresponding to the target commodity via the wireless communicator;
   acquiring, according to the guiding request, current location information of the mobile terminal, which transmits the guiding request, from a positioning apparatus via the communicator;
   determining a navigation path according to the current location information of the mobile terminal and location information of the target commodity; and
   transmitting the navigation path to at least one of the mobile terminal or an electronic signage via the communicator,
   wherein the step of transmitting the navigation path to the electronic signage via the communicator comprises:
   determining a relative distance between the mobile terminal and the electronic signage based on the current location information of the mobile terminal and location information of the electronic signage;
   comparing the relative distance with a preset first threshold distance; and
   transmitting the navigation path to the electronic signage via the communicator in response to the relative distance being less than the first threshold distance,
   wherein the guiding request is used to request guidance directed to the target commodity.

2. The method according to claim 1, wherein the step of determining at least one of the one or more commodities as a target commodity based on the information further comprises:
   displaying the information via a display of the mobile terminal;
   receiving an input to make a selection from the one or more commodities via an input apparatus of the mobile terminal; and
   determining at least one of the one or more commodities as the target commodity based on the input.

3. The method according to claim 2, wherein the step of displaying the information via a display of the mobile terminal comprises:
   displaying at least one of names, prices, pictures, promotional information, or location information of the one or more commodities via the display.

4. The method according to claim 1, further comprising:
   receiving a navigation path responsive to the guiding request via the wireless communicator; and
   displaying the navigation path via a display of the mobile terminal.

5. The method according to claim 4, wherein the step of displaying the navigation path via a display of the mobile terminal comprises:
   displaying at least one of text symbol information or icon information via the display.

6. A mobile terminal, comprising:
   a wireless communicator;
   a processor communicatively coupled to the wireless communicator; and
   a memory having stored thereon instructions which, when executed by the processor, cause the processor to perform the method according to claim 1.

7. A computer readable storage medium, having stored thereon computer instructions which, when executed by a processor, implement the steps of the method according to claim 1.

8. A computer implemented method at a server for commodity guiding, the method comprising:
   transmitting information related to one or more commodities via a communicator of the server;

receiving a guiding request corresponding to a target commodity via the communicator, the target commodity being at least one of the one or more commodities;

determining one or more electronic signages in the vicinity of the target commodity according to the guiding request; and transmitting an instruction to the one or more electronic signages to instruct the one or more electronic signages to display an indication sign for guidance from the one or more electronic signages to the target commodity, respectively;

acquiring, according to the guiding request, current location information of a mobile terminal, which transmits the guiding request, from a positioning apparatus via the communicator;

determining a navigation path according to the current location information of the mobile terminal and location information of the target commodity; and transmitting the navigation path to at least one of the mobile terminal or the electronic signages via the communicator, wherein the step of transmitting the navigation path to the electronic signage via the communicator comprises:

determining a relative distance between the mobile terminal and the electronic signage based on the current location information of the mobile terminal and location information of the electronic signage;

comparing the relative distance with a preset first threshold distance; and transmitting the navigation path to the electronic signage via the communicator in response to the relative distance being less than the first threshold distance.

9. The method according to claim 8, wherein the communicator of the server is a wireless communicator, and the step of transmitting information related to one or more commodities via a communicator of the server comprises:

broadcasting the information to a designated space via the wireless communicator.

10. The method according to claim 8, wherein the step of transmitting the navigation path to the electronic signage via the communicator further comprises:

comparing the relative distance with a preset second threshold distance; and transmitting a blinking instruction to the electronic signage via the communicator to instruct the electronic signage to cause the navigation path displayed thereon to blink in response to the relative distance being less than the second threshold distance, wherein the second threshold distance is less than the first threshold distance.

11. The method according to claim 10, wherein the instruction transmitted to the one or more electronic signages further indicates the electronic signage to continuously display the indication sign only within a preset time.

12. A server, comprising:
a communicator;
a processor communicatively coupled to the communicator; and
a memory having stored thereon instructions which, when executed by the processor, cause the processor to perform the method according to claim 8.

13. A computer readable storage medium, having stored thereon computer instructions which, when executed by a processor, implement the steps of the method according to claim 8.

14. A system for commodity guiding, the system comprising: one or more positioning apparatuses, one or more electronic signages, one or more mobile terminals, and a server communicatively connected to the one or more positioning apparatuses, the one or more electronic signages, and the one or more mobile terminals, wherein each of the one or more mobile terminals comprises:
a wireless communicator;
a processor communicatively coupled to the wireless communicator;
a memory having stored thereon instructions which, when executed by the processor, cause the processor to:
receive information related to one or more commodities via the wireless communicator;
determine at least one of the one or more commodities as a target commodity based on the information; and
transmit a guiding request corresponding to the target commodity via the wireless communicator, wherein the guiding request is used to request guidance directed to the target commodity, and wherein the server comprises:
a communicator;
a processor communicatively coupled to the communicator; and
a memory having stored thereon instructions which, when executed by the processor, cause the processor to:
transmit information related to one or more commodities via the communicator;
receive a guiding request corresponding to a target commodity via the communicator, the target commodity being at least one of the one or more commodities;
determine one or more electronic signages in the vicinity of the target commodity according to the guiding request;
transmit an instruction to the one or more electronic signages to instruct the one or more electronic signages to display an indication sign for guidance from the one or more electronic signages to the target commodity, respectively;
acquire, according to the guiding request, current location information of the mobile terminal, which transmits the guiding request, from a positioning apparatus via the communicator;
determine a navigation path according to the current location information of the mobile terminal and location information of the target commodity; and
transmit the navigation path to at least one of the mobile terminal or the electronic signages via the communicator, including:
determine a relative distance between the mobile terminal and the electronic signage based on the current location information of the mobile terminal and location information of the electronic signage;
compare the relative distance with a preset first threshold distance; and
transmit the navigation path to the electronic signage via the communicator in response to the relative distance being less than the first threshold distance.

* * * * *